US012583378B2

(12) United States Patent
Kubitza et al.

(10) Patent No.: US 12,583,378 B2
(45) Date of Patent: Mar. 24, 2026

(54) ACTIVATION DEVICE, HEADLAMP AND PROJECTION METHOD

(71) Applicant: HELLA GMBH & CO. KGAA, Lippstadt (DE)

(72) Inventors: Boris Kubitza, Möhnesee-Körbecke (DE); Jeremias Spiegel, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 50 days.

(21) Appl. No.: 18/712,349

(22) PCT Filed: Nov. 8, 2022

(86) PCT No.: PCT/EP2022/081038
§ 371 (c)(1),
(2) Date: May 22, 2024

(87) PCT Pub. No.: WO2023/088719
PCT Pub. Date: May 25, 2023

(65) Prior Publication Data
US 2025/0010787 A1      Jan. 9, 2025

(30) Foreign Application Priority Data

Nov. 22, 2021    (DE) ......................... 102021130490.3

(51) Int. Cl.
B60Q 1/16               (2006.01)
(52) U.S. Cl.
CPC .......... B60Q 1/16 (2013.01); B60Q 2300/112 (2013.01); B60Q 2300/122 (2013.01); B60Q 2300/134 (2013.01); B60Q 2300/322 (2013.01)

(58) Field of Classification Search
CPC ........ B60Q 2300/322; B60Q 2300/134; B60Q 2300/122; B60Q 2300/112; B60Q 1/16; B60Q 1/12; F21S 41/153; F21S 41/663
See application file for complete search history.

(56) References Cited

U.S. PATENT DOCUMENTS 9,041,808 B2 * 5/2015 Seki .......................... B60Q 1/04
                                                       348/148
2024/0278715 A1 * 8/2024 Kubitza ................. B60Q 1/543

FOREIGN PATENT DOCUMENTS

DE        102006048503 A1      4/2008
DE        102013215980 A1      2/2015
(Continued)

OTHER PUBLICATIONS

Machine translation of REF DE102015012022A1 (Year: 2015).*

*Primary Examiner* — Robert J May
(74) *Attorney, Agent, or Firm* — WARNER NORCROSS + JUDD LLP

(57)              ABSTRACT
The present invention relates to a light module for a lighting device of a vehicle, in particular for a headlight of a vehicle. The light module comprises a light-generating unit for emitting light, an optical unit for deforming the light emitted by the light-generating unit, and a heat sink for cooling the light-generating unit, the heat sink having a front side facing the optical unit and a rear side facing away from the optical unit, the light-generating unit being situated between the optical unit and the heat sink, the optical unit comprising at least one referencing means, and the heat sink having a recess that accommodates the referencing means on the front side facing the optical unit, and the recess being closed or substantially closed at the rear.

4 Claims, 2 Drawing Sheets

(56)          References Cited

FOREIGN PATENT DOCUMENTS

| DE | 102013019021 | A1 | 5/2015 |
| DE | 102015012022 | A1 | 3/2017 |
| FR | 3058106 | A1 | 5/2018 |
| JP | H08104170 | A | 4/1996 |

* cited by examiner

Ψ = Gierrate

δ = Lenkwinkel m = Fahrzeugmasse $l_v$ = Abstand Schwerpunkt

R = Kurvenradius

M = Momentanpol

ACTIVATION DEVICE, HEADLAMP AND PROJECTION METHOD

CROSS-REFERENCE TO RELATED APPLICATIONS

This application is the National Stage of International Application No. PCT/EP2022/081038 filed on Nov. 8, 2022, which claims priority to and all advantages of German Patent Application No. 10 2021 130 490.3 filed on Nov. 22, 2021, the disclosures of which are hereby incorporated by reference in their entirety.

BACKGROUND

The invention relates to an activation device for headlamps of a vehicle, comprising a control means for activating a light source unit of the headlamp depending on an operating parameter of the vehicle, so that a driving profile light distribution is depicted on a roadway, wherein the driving profile light distribution has a curved guide line for cornering of the vehicle.

The invention moreover relates to a headlamp for vehicles comprising an activation device, having a light source unit with a plurality of individual activatable light sources and/or individual activatable light guiding elements, and further control means for activation of the light source unit corresponding to a prescribed light distribution.

The invention moreover relates to a method for activating a headlamp, wherein depending on driving dynamics sensor signals of a vehicle, a light source unit of the vehicle is controlled to generate a driving profile light distribution on a roadway.

DE 10 2013 002 212 A1 describes a lane keeping assist system for vehicles which provides an activation device for a headlamp so that a colored light beam is projected onto a roadway when the vehicle deviates from the center of a lane in order to visually warn the driver of the vehicle. The roadway is detected by means of a camera as a sensor unit.

According to DE 10 2020 105 876 A1, a headlamp is used to project warning lines or warning arrows onto roadway markings in order to signal an improper deviation from the center of the lane to the driver.

DE 10 2015 012 022 A1 discloses a control system for a headlamp by means of which guide lines are projected onto a roadway to indicate to the driver the direction in which the vehicle is moving. Preferably, two guide lines are provided, which guide lines are projected onto the roadway at a distance from each other corresponding to a vehicle width. In this manner, the driving profile can be visualized to the driver. The visualization of the guide line takes place depending on a steering angle of the vehicle and a current speed of the same, so that a curved guide line can be projected onto the roadway when cornering.

SUMMARY

The task of the present invention is to provide an activation device for a headlamp, a headlamp as well as a method for projecting a guide line in such a way that the profile of the projected guide line possibly represents the actual driving profile of the vehicle or alternatively comes as close as possible to it.

In connection with embodiments of the present invention, to solve this task, the control means is calculated in such a way that the curved guide line is formed as part of a curved path which is present tangentially in a region of a center of gravity of the vehicle and/or in the region of a side edge of the vehicle offset transversely to a vehicle longitudinal direction with respect to the center of gravity.

The particular advantage of the invention consists in that a curvature of the curved guide line visually depicted on the roadway corresponds to the actual driving profile of the vehicle in the curve. The basic idea of the invention is to apply a calculated arc and/or circle of curvature, from which the curved guide line is derived, tangentially in the region of a center of gravity of the vehicle and not, for example, in the region of a headlamp. The center of gravity of the vehicle is usually located in a middle region between a front end and a rear end of the vehicle. If a tangent arc and/or the circular path runs in this middle region, wherein the tangent preferably runs in the vehicle longitudinal direction or alternatively in the direction of a longitudinal vehicle axis, the curved guide line depicted by the headlamp reproduces the actual driving profile of the vehicle when cornering. This is due to the fact that when driving along an arc and/or circular path, the center of gravity of the vehicle is decisive for the actual driving profile of the vehicle.

According to a further development of the invention, the guide line is configured as a circular path, wherein a radius of curvature of the curved path forms a circular radius. Advantageously, this makes it easier to calculate the curved guide line using a mathematical model.

According to a further development of the invention, a driving profile light distribution is configured by two parallel guide lines, wherein a left guide line runs in extension of a left side edge of the vehicle and a right guide line runs in extension of a right side edge of the vehicle. Advantageously, the driver hereby receives not only information relating to the current driving profile, but also, additionally, about the lateral limits of the vehicle, which is particularly helpful when driving through construction sites or narrow roadways.

According to a further development of the invention, a point of the left side edge of the vehicle, through which a left curve path containing the left guide line runs, and a point of the right side edge of the vehicle, through which a right circular path containing the right guide line runs, are arranged in a transverse plane perpendicular to the vehicle longitudinal direction, on or near which the center of gravity of the vehicle is arranged. It is therefore sufficient if the tangent of the left curve path and right curve path to run close to the point of the left or alternatively right side edge in order to visualize the actual driving profile.

To solve the task, a headlamp according to the invention comprises the features contained herein.

The particular advantage of the headlamp is that, in addition to a prescribed light distribution, for example, a low beam light distribution or a cornering light distribution, it generates a driving profile light distribution that visualizes the exact driving profile of the vehicle in a curve.

According to a further development of the invention, the activation device is installed in a housing of the headlamp and comprises a first control means for activating a first light source unit for generation of the driving profile light distribution and a second control means for activating a second light source unit for generation of the prescribed light distribution. The headlamp housing thus comprises at least two light modules for the generation of the different light functions. Advantageously, this can simplify the control of the light sources, as the control is dependent on the light function.

To solve the task, the invention comprises the features of the method contained herein.

The particular advantage of the method according to the invention consists in that an actual driving profile of the vehicle in a curve can be visualized in a simple way. For this purpose, it is sufficient to simply calculate a curve radius of the vehicle using driving dynamics sensor data, wherein a hereby characterized curve path is placed in a center of gravity of the vehicle. From this calculated middle curve radius, a first curve radius for a left curve path with a left guide line and a second curve radius for a right curve path with a right guide line can be derived with the aid of dimensional data of the vehicle, wherein the right curve path intersects a vertical left side edge plane as a tangent and the right guide line intersects a vertical right side edge plane as a tangent. By a corresponding control of the headlamp, two parallel guide lines can be projected onto the roadway, the distance between which corresponds to a vehicle width. Advantageously, the invention enables simple calculation of two parallel guide lines for continuous visualization of the driving profile of the vehicle.

According to a further development of the method according to the invention, the center of gravity of the vehicle and/or the vertical left side edge plane and the vertical right side edge plane of the same are projected onto a plane, in which plane the roadway is located. In this manner, a simple mathematical model can be used to calculate the control signals.

According to a further development of the invention, a length of the guide lines is dependent on a distance between the vehicle and a preceding vehicle, so that no undesired blinding of the preceding vehicle occurs.

According to a further development of the invention, the control signal for the light source unit is calculated in such a way that the parallel guide lines start at a distance from the vehicle and end at a greater distance from the vehicle. Preferably, the end of the guide lines is limited to a region in which the roadway is still located so that no irritation of the driver occurs.

BRIEF DESCRIPTION OF DRAWINGS

One embodiment of the invention is explained in more detail below with reference to the drawings.

Wherein.

DETAILED DESCRIPTION

Figure 1:
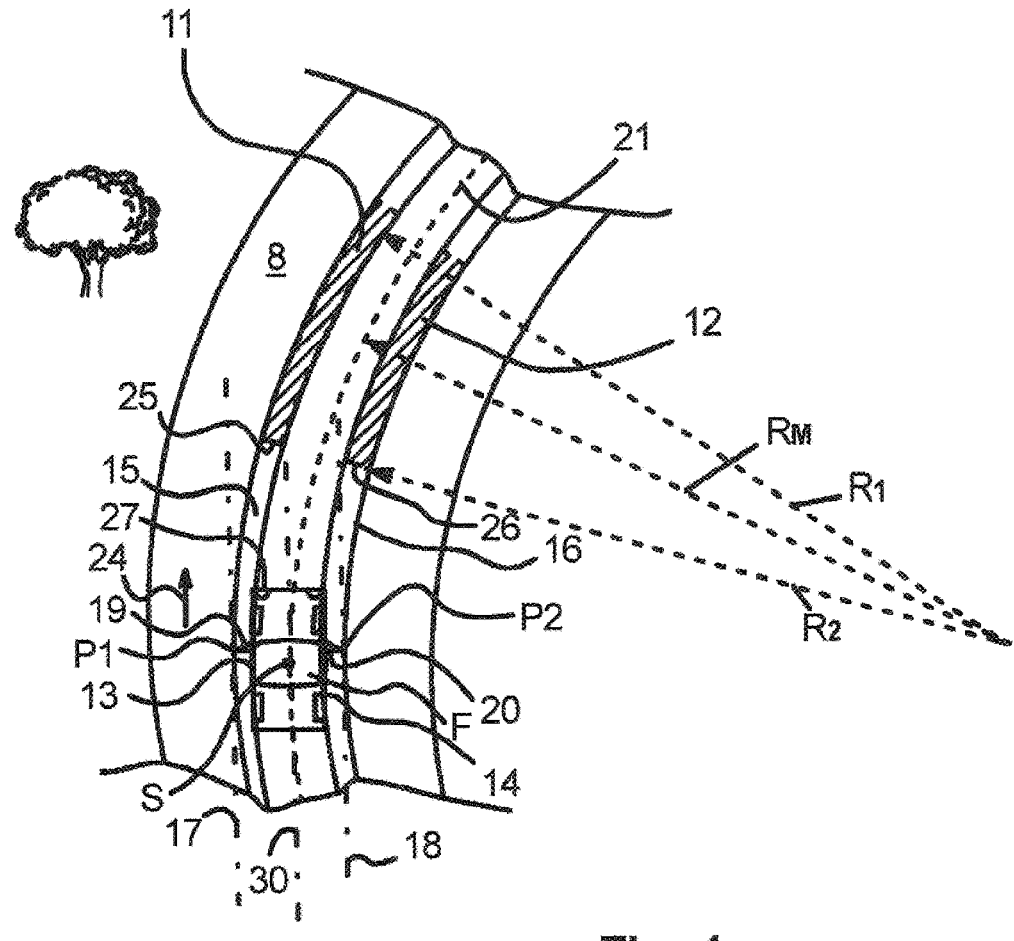
FIG. 1 shows a schematic top view of a vehicle with generated guide lines on a roadway in a curve.
Figure 2:
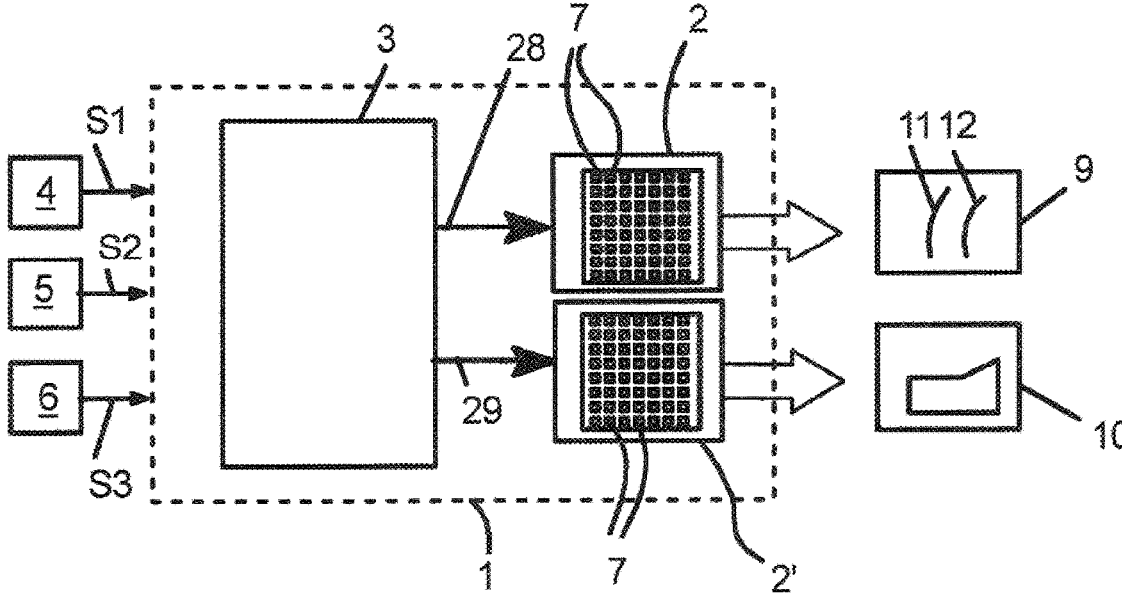
FIG. 2 shows a schematic block diagram of a headlamp according to the invention, and, FIG. 3 shows a representation of a physical single-track model upon which the activation device is based.

A headlamp for vehicles comprises a housing 1 in which a first light source unit 2 and a second light source unit 2' and an activation device 3 for activating the light source units 2, 2' are arranged. A plurality of sensors 4, 5, 6 are arranged outside the housing 1, each of which sensors provides sensor signals S1, S2 or S3 to the activation device 3. A first sensor 4 is configured as a steering angle sensor, which provides the steering angle as the driving dynamics sensor signal S1. A second sensor 5 is configured as a speed sensor, which provides the speed of the vehicle as the driving dynamics sensor signal S2. A third sensor 6 is configured as a yaw angle sensor, which provides a yaw angle of the vehicle about a vertical yaw axis as a driving dynamics sensor signal S3.

The first light source unit 2 comprises a plurality of light sources 7 arranged in the manner of a matrix as well as individually activatable, which light sources, for example, are arranged on a chip. An optical element that is not shown, for example, a lens and/or a reflector, can be assigned to the plurality of light sources 7 for illustration of the individual light sources 5 into light pixels, which generate a driving profile light distribution 9 on a roadway 8 arranged in front of the vehicle.

The second light source unit 2' moreover comprises a plurality of light sources 7 arranged in the matter of a matrix and individually activatable, the number of which light sources is greater than the number of light sources in the first light source unit 2. An optical element that is not shown, for example, a lens and/or a reflector, can be assigned to the plurality of light sources 7 for illustration of the individual light sources 5 into light pixels, which are superimposed on the roadway 8 arranged in front of the vehicle to form a prescribed light distribution 10, for example, low beam light distribution.

The headlamp is a high-resolution headlamp in which the first light source unit 2 and the second light source unit 2' can each have a matrix of light sources 7 in 256 rows and 64 columns to form over 16,000 light pixels.

According to an alternative embodiment of the invention that is not shown, the first light source unit 2 or alternatively the second light source unit 2' can also comprise light guiding elements, for example, a plurality of swiveling micromirrors (DMD) or a liquid crystal panel (LCD or LCOS), in order to generate the desired light distribution or alternatively the driving profile light distribution 9 or alternatively light distribution 10.

The control of the first light source unit 2 for generation of the driving profile light distribution 9 is explained in more detail below. In the present embodiment example, the driving profile light distribution 9 is formed by two parallel guide lines 11 and 12, which are displayed on the roadway 8 and are intended to visualize the current driving profile in a curve for the driver.

The guide lines 11, 12 extend in extension of a side edge of the vehicle F. A left guide line 11 runs on a left circular path 15 in extension of a left side edge 13 of the vehicle F; a right guide line 12 runs on a right circular path 16 in extension of a right side edge 14 of the vehicle F. FIG. 1 shows the curved profile of the left guide line 11 and the right guide line 12 during a right-hand bend. The left guide line 11 runs along the left circular path 15, which tangentially intersects the left side edge 13 of the vehicle F. The right guide line 12 lies on the second circular path 16, which intersects the right side edge 14 of vehicle F. It can be seen that a tangent 17 of the first circular path 15 intersects a left side mirror 19 of the vehicle F at an outer point P1. A second tangent 18 of the second circular path 16 intersects a right side mirror 20 of the vehicle F at an outer point P2.

The left circular path 15 forms a first curved path. The right circular path 16 forms a second curved path.

Figure 3:
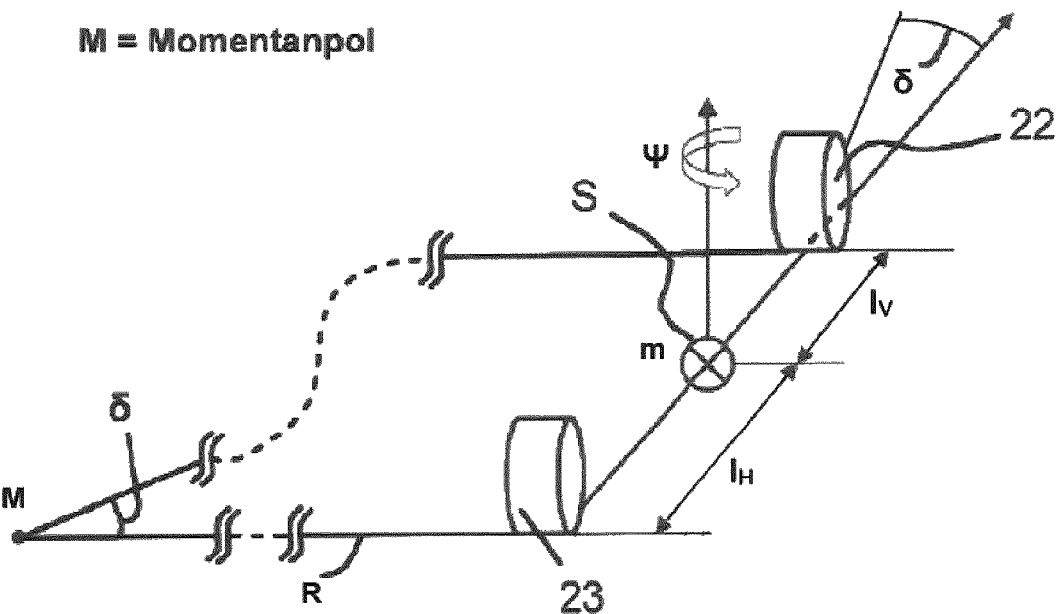

The left circular path 15 and the right circular path 16 are derived from a middle circular path 21, which runs through the center of gravity S of the vehicle F. The middle circular arc 21 is characterized by a middle radius $R_M$, which is determined on the basis of a physical single-track model, which is shown in FIG. 3, with the aid of the sensor signals S1, S2, S3. The single-track model shown in FIG. 3 assumes that the vehicle F is reduced to one track on which a front wheel 22 and a rear wheel 23 are arranged, wherein the center of gravity S of the vehicle F lies in the plane of the roadway 8. The vehicle mass m is compiled in the center of gravity S. The center of gravity S of the vehicle F has, for example, a distance Iv to the front wheel 22 and a distance $I_H$ to the rear wheel 23.

According to the invention, the activation device 3 comprises a calculation unit in which the middle curve radius $R_m$ is calculated depending on the sensor signals S1, S2, S3. This middle curve radius $R_m$ defines the middle circular arc 21. The middle circular arc 21 is laid out through the center of gravity S of the vehicle F, wherein it is assumed that the vehicle F moves in the center of gravity S tangentially to the middle circular arc 21. A middle tangent 30 runs in vehicle longitudinal direction 24.

In a further calculation step, the left circular path 15 and the right circular path 16 are calculated depending on the distance of the left side edge 13 or alternatively right side edge 14 to a longitudinal vehicle central plane in which the center of gravity S is located, see FIG. 1. Since the left side edge 13 is formed by the free end P1 of the left side mirror 19 and the right side edge 14 is formed by the free end P2 of the right side mirror 20, the middle circular path 21 is displaced transversely to the longitudinal vehicle central plane by the distance between the same on the one side and the free end P1, P2 of the left side mirror 19 or alternatively of the right side mirror 20, until the tangent 17, 18 of the middle circular path 21 runs through the point P1 or alternatively P2. The distance of the free end P2 of the right side mirror 20 to the vehicle central plane, in which the center of gravity S is located, is used for the calculation of the right circular path 16, wherein this distance corresponds to the difference from the first radius $R_1$, by which the left circular path 15 is characterized. For the calculation of the left circular path 15, the distance of the free end P1 of the left side mirror 19 to the vehicle central plane, in which the center of gravity S is located, is used, wherein this distance corresponds to the difference from the second radius $R_2$, by which the right circular path 16 is characterized. As can be seen from FIG. 1, the left circular path 15 at the left side mirror 19, and the right circular path 16 at the right side mirror 20, run tangentially to the vehicle F. The left tangent 17 at the left side mirror 19 and the right tangent 18 at the right side mirror 20 run in the vehicle longitudinal direction 24 and parallel to each other.

After determination of the left circular path 15 and the right circular arc 16, the left guide line 11 and the right guide line 12 are determined in a further step so that only a partial region of the roadway 8 is illuminated by the guide lines 11, 12. The left guide line 11 comprises a first end 25, which is at a prescribed constant distance from the front end 27 of the vehicle F. The left guide line 11 comprises a predetermined length. A first end 26 of the right guide line 12 is arranged at a prescribed distance from the front end 27. The right guide line 12 comprises a length. The distance between the first ends 25, 26 and the front end 27 of the vehicle F can be in the range of 5 m to 7 m, preferably 6 m. The length of the guide lines 11, 12 can be in the range of 15 m to 25 m.

The activation device 3 generates an activation signal 28 for the first light source unit 2, so that the driving profile light distribution 9 described above, consisting of the two guide lines 11, 12, is projected.

In addition, the activation signal 28 can activate the light source unit 2 in such a way that the length of the left guide line 11 and the right guide line 12 is varied or alternatively reduced, for example, so as not to blind a preceding vehicle.

As can be seen from FIG. 1, the curved left guide line 11 and the curved right guide line 12 are respectively each formed as a circular ring section of the left circular path 15 or alternatively of the right circular path 16.

It is understood that instead of intersecting the center of gravity S of the vehicle F, the middle circular path 21 can run in the vicinity of the center of gravity S of the vehicle F, wherein the tangent 30 of the middle circular path 21 running in the vehicle longitudinal direction 24 is arranged transversely to the vehicle longitudinal direction 24 offset to the center of gravity S of the vehicle F. This results in no significant change in the profile of the left guide line 11 and of the right guide line 12. That which is important is that the middle circular path 21 touches the center of gravity S of the vehicle F tangentially or runs in the vicinity of the center of gravity S. The point of contact of the tangent 30 is therefore either in the center of gravity S of the vehicle F or offset transversely to the vehicle longitudinal direction 24 with respect to the center of gravity S.

The first light source unit 2 can be controlled independently of the second light source unit 2'. The second light source unit 2' is controlled by an activation signal 29 in such a way that the specified light distribution 10 is generated. The first light source unit 2 and the second light source unit 2' can form separate light modules within the housing 1. If necessary, the activation device 3 can also be divided into a first activation section, which is used for activating the first light source unit 2, and a second activation section, which is used for activating the second light source unit 2'.

It is understood that the activation signal 28 is continuously calculated in real time and applied to the light source unit (2).

Preferably, the left guide line 11 and the right guide line 12 have a length which lies in a range of three to six times the distance between the first end 25, 26 thereof and the front end 27 of the vehicle F.

LIST OF REFERENCE SIGNS

1 housing
2, 2' light source unit
3 activation device
4 sensor
5 sensor
6 sensor
7 light source
8 roadway
9 driving profile light distribution
10 light distribution
11 left guide line
12 right guide line
13 left side edge
14 right side edge
15 first circular path
16 second circular path
17 tangent
18 tangent
19 left side mirror
20 right side mirror
21 central circular path
22 front wheel
23 rear wheel
24 vehicle longitudinal direction
25 $1^{st}$ end
26 $1^{st}$ end
27 front end
28 activation signal
29 activation signal
30 tangent
S1, S2, S3 sensor signal
S center of gravity

7

F vehicle
P1, P2 point
$R_M$, $R_1$, $R_2$ curve radius
m vehicle mass

The invention claimed is:

1. A method for activating a headlamp, wherein, depending on driving dynamics sensor signals of a vehicle, a light source unit of the vehicle is controlled to generate a driving profile light distribution on a roadway, the method comprising:

determining a middle curve radius traversed by the vehicle in a center of gravity of the vehicle, calculating a first circular radius for a left guide line of the driving profile light distribution and of a second circular radius for a right guide line of the driving profile light distribution by a changing of the length of a middle radius of a middle circular path, on which the center of gravity of the vehicle lies, on the one hand up to the first circular radius of a left circular path, which touches a left side edge, and on the other hand up to the second circular radius of a right circular path, which touches a right side edge, and generating an activation signal for the light source unit, so that in cornering a left guide line is projected onto the roadway through a circular ring section on the left circular path and a right guide line is projected onto the roadway through a circular ring section on the right circular path, wherein, in order to calculate the left guide line and the right guide line, the center of gravity of the vehicle is projected onto a horizontal plane in which the roadway is located.

2. The method according to claim 1, wherein the activation signal is calculated continuously in real time.

3. The method according to claim 1, wherein a length of the left guide line and the right guide line is constant or is dependent on a distance of the vehicle to a preceding vehicle.

4. A method for activating a headlamp, wherein, depending on driving dynamics sensor signals of a vehicle, a light source unit of the vehicle is controlled to generate a driving profile light distribution on a roadway, the method comprising:

determining a middle curve radius traversed by the vehicle in a center of gravity of the vehicle, calculating a first circular radius for a left guide line of the driving profile light distribution and of a second circular radius for a right guide line of the driving profile light distribution by a changing of the length of a middle radius of a middle circular path, on which the center of gravity of the vehicle lies, on the one hand up to the first circular radius of a left circular path, which touches a left side edge, and on the other hand up to the second circular radius of a right circular path, which touches a right side edge, and generating an activation signal for the light source unit, so that in cornering a left guide line is projected onto the roadway through a circular ring section on the left circular path and a right guide line is projected onto the roadway through a circular ring section on the right circular path, wherein the activation signal is calculated in such a way that a first end of the left guide line and of the right guide line is arranged at a distance from a front end of the vehicle, and wherein a length of the left guide line and of the right guide line is dimensioned in such a way that it lies in a range between a threefold and a sixfold distance of the first end of the left guide line or alternatively of the right guide line to the front end of the vehicle.

* * * * *